(No Model.)
T. A. SWEET.
WHEEL HARROW.
No. 279,613. Patented June 19, 1883.
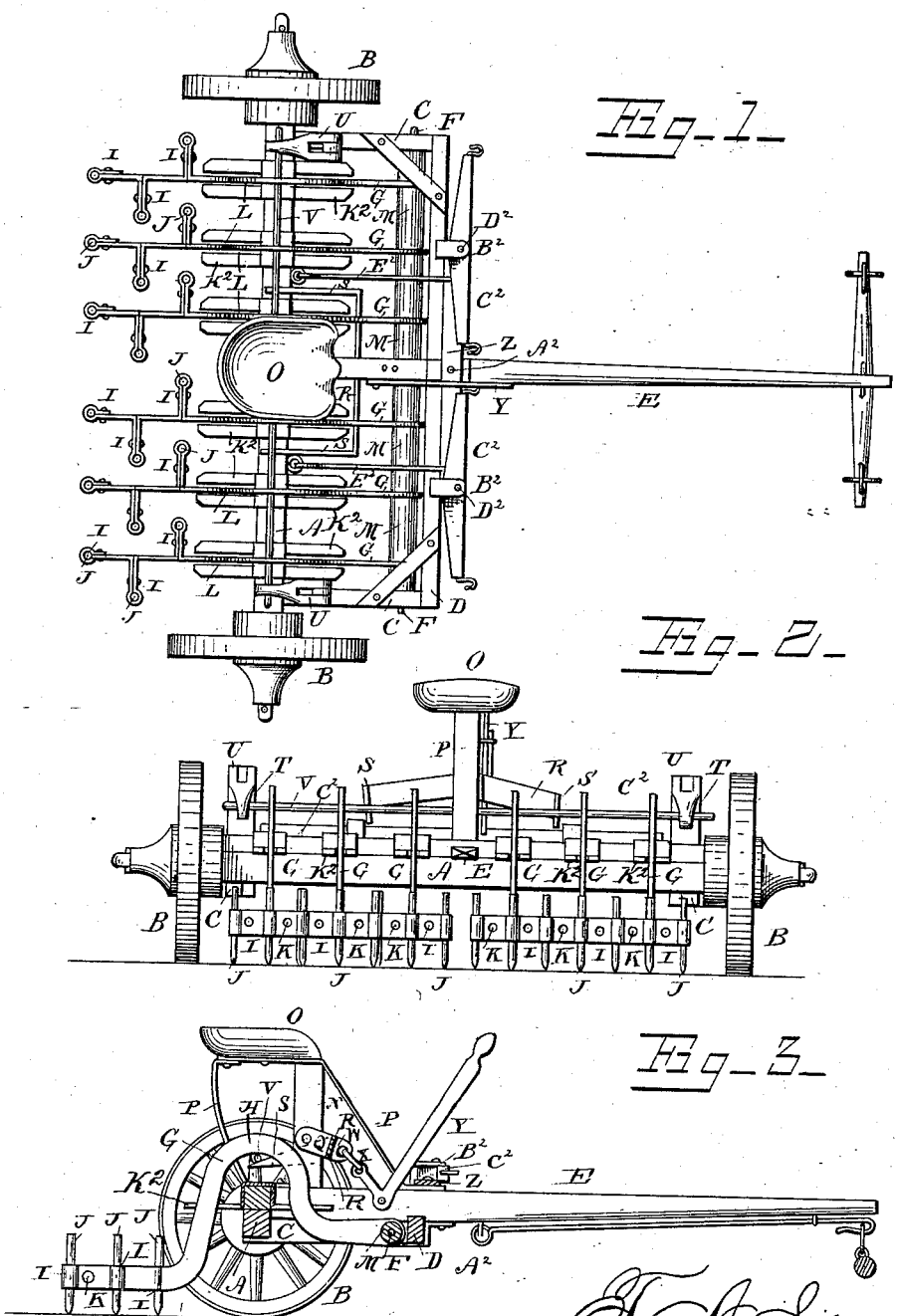

UNITED STATES PATENT OFFICE.

THOMAS A. SWEET, OF CAMBRIA, CALIFORNIA.

WHEEL-HARROW.

SPECIFICATION forming part of Letters Patent No. 279,613, dated June 19, 1883.

Application filed January 24, 1883. (No model.)

*To all whom it may concern:*

Be it known that I, THOMAS A. SWEET, a citizen of the United States, residing at Cambria, in the county of San Luis Obispo and State of California, have invented a new and useful Harrow, of which the following is a specification, reference being had to the accompanying drawings.

This invention relates to sulky or wheel harrows; and it has for its object to provide a simple, durable, and efficient machine, as will be hereinafter more fully described, and particularly pointed out in the claims.

In the drawings hereto annexed, Figure 1 is a top view of my improved harrow. Fig. 2 is a rear view of the same, and Fig. 3 is a longitudinal vertical sectional view.

The same letters refer to the same parts in all the figures.

The frame of my improved machine consists principally of the axle A, which is supported upon the wheels B B, and provided with two forwardly-projecting side pieces, C C, which are connected by the front piece, D, of the frame. E is the tongue, which connects the axle with the front piece, D.

Upon a shaft, F, which connects the side pieces, C C, just in rear of the front piece, D, are hinged the arms or beams G G, which carry the harrow-teeth. Said arms or beams are formed of metal and provided with inverted-U-shaped arches H, straddling the axle of the machine and extending downwardly in rear of the latter to within a suitable distance of the ground, from whence they extend rearwardly, as shown. The rear parts of the arms or beams are bent or curved in a horizontal plane, so as to form three distinct loops, I I, two of which project laterally at right angles—one to the right and the other to the left—and the third projects directly backward. These loops are adapted to receive and hold the harrow-teeth J J, which are held securely in position by bolts K passing transversely through and securing the said loops. It is evident by this construction that the harrow-teeth may be readily raised or lowered, as may be required.

To guide the harrow-beams and prevent lateral movement of the same, the axle A is provided with brackets $K^2$ $K^2$, projecting forwardly and rearwardly, as shown, and provided with slots L L, which receive and guide the inverted-U-shaped arches H, which, as stated, form part of the harrow-beams. The latter are spaced upon the shaft F by means of rollers or washers M M.

N is an upright or standard mounted or secured upon the tongue E and supporting the driver's seat O, for which suitable spring-braces, P P, are also provided. To the side of said upright N is pivoted an arm, Q, carrying a bail, R, the arms of which, S S, extend rearwardly at the sides of the upright N.

T T are two uprights mounted upon the sides of the frame, and having at their upper ends hinged arms or levers U U, extending rearwardly, and connected by a rod or shaft, V, which passes beneath the arches H of the harrow-beams parallel to the axle. The rod or shaft V rests upon the arms S S of the bail R, which latter has another forwardly-projecting arm, W, which is connected by a short rod or link, X, with a bell-crank lever, Y, pivoted to the side of the tongue, as shown, and having an arm or handle extending upwardly, so as to be conveniently grasped and operated by the driver. It will be seen that by manipulating the lever Y the bail R will be operated so as to raise the rod or shaft V, and thus lift all of the harrow-beams off the ground.

Z is a plate pivoted upon the tongue E by a bolt, $A^2$, and provided at its ends with rearward-projecting straps, which are bent upwardly and forwardly so as to form bails or loops $B^2$ $B^2$, in which the whiffletrees $C^2$ $C^2$ are pivoted by vertical pins or bolts $D^2$. The ends of the plate Z are connected with the axle A by chains or rods $E^2$, thus making a direct draft upon the machine.

The operation and advantages of my improved harrow will be readily understood from the foregoing description, taken in connection with the drawings hereto annexed.

The harrow-beams are simple in construction, durable, and may be easily regulated in any desired manner.

The harrow-teeth are evenly distributed, and may be easily raised or lowered in their loops or sockets.

I claim as my invention—

1. The combination of the harrow-frame, the axle, the beams pivoted upon a rod or shaft near the front end of said frame, and provided with inverted-U-shaped arches which straddle the axle, and slotted guide-brackets mounted upon and projecting forwardly and rearwardly from the axle, as set forth.

2. In a sulky-harrow, the herein-described beams, constructed with inverted-U-shaped arches adapted to straddle the axle, and having rearward extensions which are bent in a horizontal plane so as to form loops adapted to receive the vertical harrow-teeth, as set forth.

3. The combination of the frame having uprights N T T, the pivoted beams G, having arches H, the hinged arms U U, connecting-rod V, bail R, having arms Q W, and the bell-crank lever Y, all arranged and operating substantially as set forth.

In testimony that I claim the foregoing as my own I have hereto affixed my signature in presence of two witnesses.

THOMAS ALBERT SWEET.

Witnesses:
FREDERICK OTT,
JOS. JOHNSON.